United States Patent
Li (10) Patent No.: US 12,127,030 B2
(45) Date of Patent: Oct. 22, 2024

(54) METHOD AND DEVICE FOR REPORTING BEAM FAILURE, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 438 days.

(21) Appl. No.: 17/605,508

(22) PCT Filed: Apr. 25, 2019

(86) PCT No.: PCT/CN2019/084363
§ 371 (c)(1),
(2) Date: Oct. 21, 2021

(87) PCT Pub. No.: WO2020/215286
PCT Pub. Date: Oct. 29, 2020

(65) Prior Publication Data
US 2022/0210683 A1    Jun. 30, 2022

(51) Int. Cl.
*H04W 24/10* (2009.01)
*H04W 72/044* (2023.01)

(52) U.S. Cl.
CPC ......... *H04W 24/10* (2013.01); *H04W 72/046* (2013.01)

(58) Field of Classification Search
CPC ... H04W 24/10; H04W 72/046; H04W 16/28; H04L 5/0023; H04B 7/0695; H04B 7/088
See application file for complete search history.

(56) References Cited

U.S. PATENT DOCUMENTS

| | | | |
|---|---|---|---|
| 2018/0278392 A1 | 9/2018 | Onggosanusi et al. | |
| 2018/0287860 A1 | 10/2018 | Xia et al. | |
| 2020/0322035 A1* | 10/2020 | Shi | H04W 72/046 |
| 2021/0068188 A1* | 3/2021 | Ryu | H04L 5/0023 |
| 2022/0061087 A1* | 2/2022 | Koskela | H04W 72/21 |
| 2022/0264546 A1* | 8/2022 | Xiong | H04W 72/044 |
| 2022/0311500 A1* | 9/2022 | Zheng | H04L 5/0091 |
| 2023/0013617 A1* | 1/2023 | You | H04L 5/0035 |

(Continued)

FOREIGN PATENT DOCUMENTS

| | | | |
|---|---|---|---|
| CN | 107888256 A | 4/2018 | |
| WO | WO 2019027294 A1 | 2/2019 | |
| WO | WO-2019032882 A1 * | 2/2019 | ........... H04B 7/0695 |

OTHER PUBLICATIONS

PCT/CN2019/084363 English translation of the International Search Report dated Jan. 2, 2020, 2 pages.

(Continued)

*Primary Examiner* — Deepa Belur
(74) *Attorney, Agent, or Firm* — Cozen O'Connor (57) ABSTRACT

A method for reporting an antenna beam failure includes: determining, by a terminal, that a target secondary serving cell among n accessed secondary serving cells has a beam failure, where n is a positive integer; and transmitting, by the terminal, a first medium access control (MAC) control element (CE) signaling to a base station, the first MAC CE signaling including beam failure indication information for indicating that the target secondary serving cell has the beam failure. A device and a storage medium for reporting a beam failure are also disclosed.

18 Claims, 4 Drawing Sheets

(56) References Cited

U.S. PATENT DOCUMENTS

2024/0172310 A1* 5/2024 Xu .................. H04B 7/0695

OTHER PUBLICATIONS

Korean Patent Application No. 10-2021-7036039, Office Action dated Jun. 28, 2023; 4 pages.
Korean Patent Application No. 10-2021-7036039, English translation of Office Action dated Jun. 28, 2023, 4 pages.
Ericsson "Latency analysis of SCell BFR solutions" 3GPP TSGN-RAN WG1 Meeting #96bis, Tdoc R1-1905159, Apr. 2019, 4 pages.
Intel Corporation "Summary on SCell BFR and L1-SINR" 3GPP TS-RAN WG1 Meeting #96bis, R1-1905638, Apr. 2019, 22 pages.
Indian Patent Application No. 202147053123 Office Action dated May 4, 2022, 6 pages.
European Patent Application No. 19926066.2 Search and Opinion dated Mar. 21, 2022, 8 pages.
Japanese Patent Application No. 2021-561850, Office Action dated Nov. 1, 2022, 4 pages.
Japanese Patent Application No. 2021-561850, English translation of Office Action dated Nov. 1, 2022, 4 pages.
Convida Wireless "On Beam Failure Recovery for SCell" 3GPP TSG-RAN WG1 #96, R1-1903159 Feb. 2019, 7 pages.
Lenovo, et al. "Discussion of multi-beam operation" 3GPP TSG-RAN WG1 #96bis R1-1904573, Apr. 2019, 7 pages.
Ericsson "Latency analysis of SCell BFR solutions" TSG-RAN WG1 Meeting #96, Tdoc R1-1902957, Feb. 2019.
Japanese Patent Application No. 2021-561850, Office Action dated Mar. 7, 2023; 3 pages.
Japanese Patent Application No. 2021-561850, English translation of Office Action dated Mar. 7, 2023, 4 pages.
SONY "Enhancements on multi-beam operation" 3GPP TSG RAN WG1 #96bis, R1-1904241, Apr. 2019, 10 pages.

* cited by examiner

METHOD AND DEVICE FOR REPORTING BEAM FAILURE, AND STORAGE MEDIUM

CROSS-REFERENCE TO RELATED APPLICATION

This application is a national phase of International Application No. PCT/CN2019/084363, filed on Apr. 25, 2019, the entire contents of which are incorporated herein by reference.

TECHNICAL FIELD

Embodiments of the disclosure relate to the field of communication technologies, and more particularly, to a method, a device and a storage medium for reporting an antenna beam failure.

BACKGROUND

Base stations and terminals in 5G (5th Generation Mobile Communication Technology) NR (New Radio) systems may employ beams to transmit and receive information. For example, a base station may transmit downlink control information of a PDCCH (Physical Downlink Control Channel) to a terminal through a beam.

When the terminal moves or the base station's antenna direction changes, there may be a problem of beam failure on the beam, configured by the base station for the terminal, for receiving the downlink control information. At present, communication standards define a RS (Reference Signal) set for detecting a beam failure. When the terminal detects that channel measurement parameters corresponding to all RSs in the RS set are lower than a first threshold, the terminal determines that the beam failure occurs.

At this time, the terminal may detect whether there is a RS with a L1-RSRP (Layer1-Reference Signal Received Power) greater than a second threshold in a RS set for determining candidate beams based on the RS set, configured by the base station, for determining candidate beams. If there is such the RS, the terminal transmits a random access preamble corresponding to the RS on a random access time-frequency resource corresponding to the RS. In this way, it implicitly informs the base station that the terminal has the beam failure and finds the candidate beam. Subsequently, the terminal detects a response to a beam failure request, from the base station, and waits for beam failure recovery.

At present, a reporting process and a recovery process is defined only when the terminal has a beam failure on a PCell (Primary Cell).

SUMMARY

According to a first aspect of embodiments of the disclosure, a method for reporting a beam failure is provided.

The method includes determining, by a terminal, that a target secondary serving cell among n accessed secondary serving cells has a beam failure, where n is a positive integer.

The method further includes transmitting, by the terminal, a first medium access control (MAC) control element (CE) signaling to a base station, the first MAC CE signaling including beam failure indication information for indicating that the target secondary serving cell has the beam failure.

According to a second aspect of embodiments of the disclosure, a device for reporting a beam failure, for a terminal, is provided.

The device includes a processor.

The device includes a memory for storing instructions executable by the processor.

The processor is configured to determine that a target secondary serving cell among n accessed secondary serving cells has a beam failure, where n is a positive integer.

The processor is configured to transmit a first medium access control MAC control element CE signaling to a base station, the first MAC CE signaling including beam failure indication information for indicating that the target secondary serving cell has the beam failure.

According to a third aspect of embodiments of the disclosure, a non-transitory computer-readable storage medium is provided. The non-transitory computer-readable storage medium has stored therein instructions that, when executed by a processor, the method for reporting the beam failure as described in the first aspect of the disclosure is performed.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Network architectures and service scenarios described in embodiments of the disclosure may be intended to more clearly illustrate technical solutions provided in the embodiments of the disclosure, and may not constitute a limitation to the technical solutions provided in the embodiments of the disclosure. Those skilled in the art may know that the technical solutions provided in the embodiments of the disclosure are equally applicable to similar technical problems as the evolution of network architectures and the emergence of new service scenarios.

Figure 1:
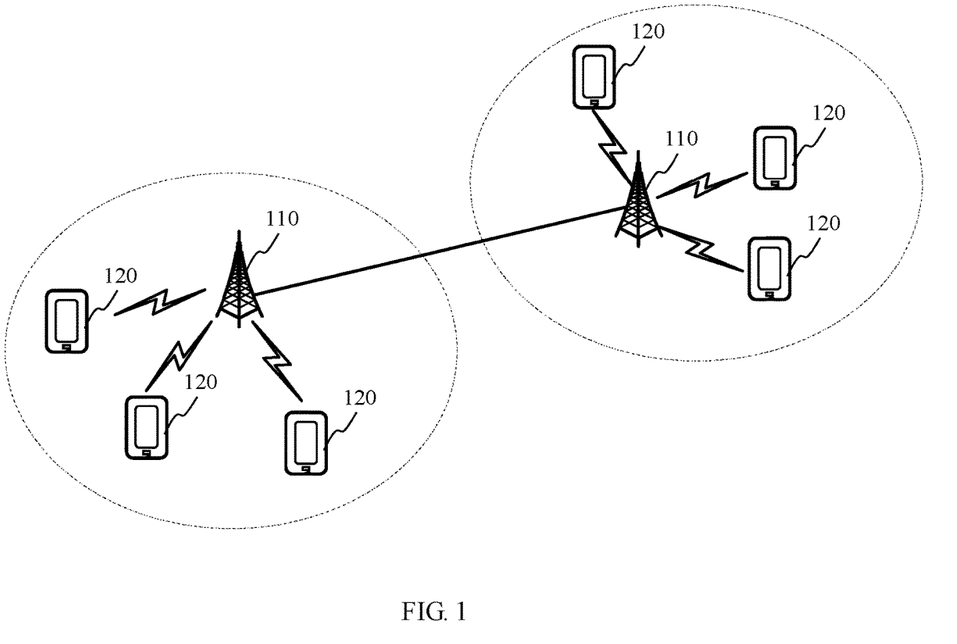
FIG. 1 is a schematic diagram illustrating a network architecture, according to an exemplary embodiment.

FIG. 1 is a schematic diagram illustrating a network architecture according to an exemplary embodiment. The network architecture may include one or more base stations 110 and one or more terminals 120.

The base station 110 is deployed in an access network. The access network in the 5G NR system may be called as a NG-RAN (New Generation-Radio Access Network). The base station 110 and the terminal 120 may communicate with each other through a certain air interface technology, for example, a cellular technology.

The base station 110 may be a device deployed in the access network and for providing a wireless communication function to the terminal 120. The base stations 110 may include various forms of macro base stations, micro base stations, relay stations, access points, and the like. In systems adopting different wireless access technologies, devices equipped with functions of base stations may have different names. For example, in the 5G NR system, it may be called as gNodeB or gNB. The name "base station" may change with the evolution of communication technologies. For the sake of easy description, in the embodiments of the disclosure, the above device that provides the wireless communication function to the terminal 120 is collectively called as the base station. The base station 110 may also be an on-board device, which is suitable for communication among vehicles in the Internet of Vehicles. When communicating among vehicles, channels or signalings in the disclosure are all channels or signalings suitable for the Sidelink.

There may be a plurality of terminals 120. One or more terminals 120 may be deployed in a cell governed by each base station 110. The terminals 120 may include hand-held devices, on-board devices, wearable devices, and computing devices with the wireless communication function, or other processing devices connected to a wireless modem, as well as various forms of UE (User Equipment), MS (Mobile Station), terminal devices, etc. For the sake of easy description, in the embodiments of the disclosure, these devices are collectively called as the terminals. The terminal 120 may also be an on-board device, which is suitable for communication among vehicles in the Internet of Vehicles. When communicating among vehicles, channels or signalings in the disclosure are all channels or signalings suitable for the Sidelink.

The "5G NR system" in the embodiments of the disclosure may also be referred to as a 5G system or an NR system, and those skilled in the art may understand its meaning. The technical solutions described in the embodiments of the disclosure may be applicable to the 5G NR system, and may also be applicable to subsequent evolution systems of the 5G NR system and the 5G NR vehicle networking system.

The disclosure makes relevant definitions for the reporting process and the recovery process when the terminal has a beam failure on a SCell (Secondary Cell).

Figure 2:
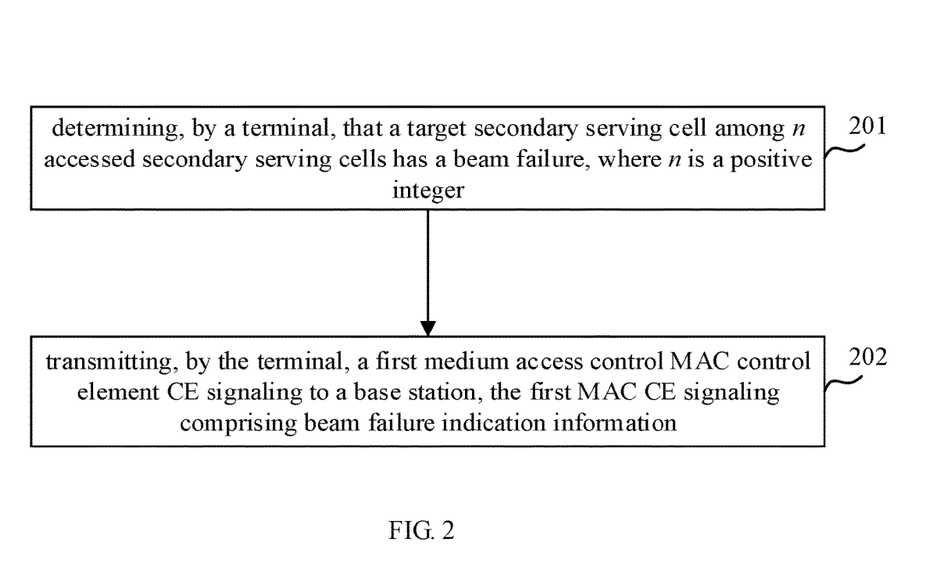
FIG. 2 is a flow chart illustrating a method for reporting a beam failure, according to an exemplary embodiment.

FIG. 2 is a flow chart illustrating a method for reporting a beam failure, according to an exemplary embodiment. The method may be applicable to the terminal illustrated in FIG. 1. The method may include the following.

In 201, the terminal determines that a target secondary serving cell among n accessed secondary serving cells has a beam failure, where n is a positive integer.

In a CA (Carrier Aggregation) scenario, the terminal may have multiple serving cells. The multiple serving cells may be divided into a primary serving cell and at least one secondary serving cell. The primary serving cell refers to a serving cell working on a primary frequency band. The terminal may perform an initial connection establishment process or a connection re-establishment process with the primary serving cell. The secondary serving cell refers to a serving cell working on a secondary frequency band. The secondary serving cells may provide additional wireless resources to improve the throughput of the terminal.

It should be noted that the terminal may access multiple secondary serving cells at the same time.

When the terminal moves or the base station's antenna direction changes, there may be a problem of beam failure on the beam, configured by the base station for the terminal, for receiving downlink control information transmitted by the secondary serving cell. Further, the terminal may detect whether there is a beam failure in a secondary serving cell among the multiple accessed secondary serving cells, and determine the target secondary serving cell where the beam failure occurs.

Optionally, the base station configures the terminal with an RS set for detecting the beam failure of each secondary serving cell configured with the PDCCH. When the terminal detects that channel measurement parameters corresponding to all RSs in the RS set are lower than the threshold, the terminal determines that the beam failure occurs in the secondary serving cell.

In 202, the terminal transmits a first medium access control MAC control element CE signaling to a base station. The first MAC CE signaling includes beam failure indication information.

When the terminal determines that the target secondary serving cell in the multiple accessed secondary serving cells has the beam failure, it may indicate to the base station that the target secondary serving cell has the beam failure through the first MAC CE signaling. The first MAC CE signaling includes the foregoing beam failure indication information, and the beam failure indication information is configured to indicate that the target secondary serving cell has the beam failure.

Optionally, the foregoing target secondary serving cell may be one or more secondary serving cells among the n secondary serving cells accessed by the terminal.

In an embodiment, the beam failure indication information is represented by m bit code words, and n bit code words among the m bit code words and the n secondary serving cells have a one-to-one correspondence, m is an integer greater than or equal to n; in which an $i^{th}$ bit code word in the n bit code words is configured to indicate whether an $i^{th}$ secondary serving cell among the n secondary serving cells has the beam failure, and i is a positive integer less than or equal to n.

The length (i.e., m) of bit code words in the aforementioned beam failure indication information may be pre-defined by the protocol, which means that beam failure conditions of m secondary serving cells may be indicated at most at one time. For example, m is 8, 16, 32 or other values. The n bit code words may be the first n bit code words among the m bit code words and correspond to the n secondary serving cells in the one-to-one correspondence.

When the beam failure indication information is represented by the m bit code words, the terminal may simultaneously report one or more target secondary serving cells where the beam failure occurs.

Exemplarily, it is assumed that m is 5 and the terminal has accessed 3 secondary serving cells (respectively, SCell #1, SCell #2 and SCell #3). The beam failure indication information is represented by 5 bit code words, and the first 3 bit code words in the 5 bit code words correspond to SCell #1, SCell #2 and SCell #3 in sequence. It is assumed a bit value of 1 indicates that the beam failure has occurred, and 0 indicates that the beam failure has not occurred. When the beam failure indication information is 01000, it means that SCell #2 has the beam failure, and SCell #1 and SCell #3 have no beam failure. When the beam failure indication information is 10100, it means that SCell #1 and SCell #3 have the beam failure, and SCell #2 has no beam failure. When the beam failure indication information is 11100, it means that SCell #1, SCell #2 and SCell #3 all have the beam failure.

In a further embodiment, the beam failure indication information is represented by k bit code words, $k=\lceil \log_2 n \rceil$, and $\lceil \: \rceil$ represents rounding up; in which the k bit code words are identification information of the target secondary serving cell.

In the equation $k=\lceil \log_2 n \rceil$, $\lceil \: \rceil$ represents rounding up. For example, when n is 3 or 4, k is 2; when n is one of 5 to 8, k is 3; when n is one of 9 to 16, k is 4, and the like. The identification information of the target secondary serving cell is configured to uniquely identify the target secondary serving cell.

Since the k bit code words are the identification information of the target secondary serving cell, the terminal may report one target secondary serving cell where the beam occurs at one time only when the beam failure indication information is represented by the above k bit code words.

Exemplarily, it is assumed that n is 4, and it means that the terminal accesses the four secondary serving cells of SCell #1, SCell #2, SCell #3 and SCell #4. k is taken as 2, that is, the beam failure indication information uses 2 bit code words as representation. When the 2 bit code words is 00, it means that SCell #1 has the beam failure; when the 2 bit code words is 01, it means that SCell #2 has the beam failure; when the 2 bit code words is 10, it means that SCell #3 has the beam failure; when the 2 bit code words is 11, it means that SCell #4 has the beam failure.

In conclusion, in the technical solutions provided in the embodiments of the disclosure, when the terminal determines that the target secondary serving cell among the multiple accessed secondary serving cells has the beam failure, it transmits the MAC CE signaling including the beam failure indication information to the base station to notify the base station of the target secondary serving cell with the beam failure. Therefore, it may provide the reporting solution for the terminal when the beam failure occurs in the secondary serving cell, and realize the reporting of the beam failure condition of the secondary serving cell.

The above embodiments introduce and explain the beam failure reporting of the secondary serving cell, and the following describes and explains the beam failure recovery of the secondary serving cell after the beam failure occurs.

The terminal may also select a target beam for the beam failure recovery from p candidate beams, and transmit target beam indication information to the base station. The target beam indication information is configured to indicate the selected target beam, and p is an integer greater than 1.

Optionally, for each secondary serving cell configured with PDCCH and beam failure detection and beam failure recovery, the p candidate beams are beams configured by the base station through a radio resource control RRC signaling; or the p candidate beams are beams activated by a MAC signaling among multiple beams configured by the base station through a RRC signaling.

When the terminal determines that the target secondary serving cell has the beam failure, it may select a candidate beam with a signal quality greater than a preset threshold from the multiple candidate beams corresponding to the target secondary serving cell as the target beam. The above-mentioned signal quality may be a L1-RSRP (Layer1-Reference Signal Receiving Power), or a L1-SINR (Layer 1-Signal to Interference plus Noise Ratio), or a L1-RSRQ (Layer1-Reference Signal Receiving Quality), or the like, which is not limited in the embodiments of the disclosure.

The above-mentioned target beam may be one or multiple.

In a possible implementation manner, the first MAC CE signaling further includes target beam indication information. That is, when the terminal reports the beam failure condition of the secondary serving cell to the base station through the first MAC CE signaling, it also reports the target beam found by the terminal for the beam failure recovery through the first MAC CE signaling.

In another possible implementation manner, the terminal transmits a second MAC CE signaling to the base station. The second MAC CE signaling includes target beam indication information. The second MAC CE signaling is another signaling different from the first MAC CE signaling. That is, the terminal separately reports the beam failure condition of the secondary serving cell and the target beam found by the terminal for the beam failure recovery through two different MAC CE signalings. In addition, the first MAC CE signaling and the second MAC CE signaling may be transmitted at the same time or at different times. For example, the first MAC CE signaling is transmitted first, and the second MAC CE signaling is transmitted later.

In addition, the target beam indication information may be expressed in the following two ways.

In a possible implementation manner, the target beam indication information is represented by q bit code words, and p bit code words among the q bit code words and the p candidate beams have a one-to-one correspondence, q is an integer greater than or equal to p; in which a $j^{th}$ bit code word among the p bit code words is configured to indicate that a $j^{th}$ candidate beam among the p candidate beams is selected as the target beam, and j is a positive integer less than or equal to p.

The length (that is, q) of bit code words of the target beam indication information may be pre-defined by the protocol. For example, q is 4, 8, 16, or other values. The foregoing p bit code words may be the first p bit code words among the q bit code words.

Exemplarily, it is assumed that q is 4 and the base station configures 3 candidate beams (beam #1, beam #2, and beam #3, respectively) for the terminal. The target beam indication information is represented by 4 bit code words. The first 3 bit code words of the 4 bit code words correspond to beam #1, beam #2, and beam #3 in sequence. It is assumed that 1 indicates that it is selected as the target beam, and 0 indicates that it is not selected as the target beam. When the target beam indication information is 0100, it means beam #2 is selected as the target beam, and beam #1 and beam #3 are not selected as the target beam; when the target beam indication information is 1010, it means beam #1 and beam #3 is selected as the target beam, and beam #2 is not selected as the target beam; when the target beam indication information is 1110, it means that beam #1, beam #2, and beam #3 are all selected as the target beam.

When the target beam indication information is represented by the above q bit code words, the terminal may report one or more target beams for the beam failure recovery at the same time.

In another possible implementation manner, the target beam indication information is represented by r bit code words, r=⌈log₂ p⌉, and ⌈ ⌉ represents rounding up; in which the r bit code words are identification information of the target beam.

In the equation r=⌈log₂ p⌉ ⌈ ⌉ represents rounding up. For example, when p is 3 or 4, r is 2; when p is one of 5 to 8, r is 3; when p is one of 9 to 16, r is 4, and the like. The identification information of the target beam is configured to uniquely identify the target beam.

Since the r bit code words are identification information of the target beam, the terminal may report only one target beam for the beam failure recovery at one time when the target beam indication information is represented by the r bit code words.

Exemplarily, it is assumed that p is 4, and it means that the candidate beams include beam #1, beam #2, beam #3, and beam #4. r takes 2, that is, the target beam indication information is represented by 2 bit code words. When the 2 bit code words are 00, it means that beam #1 of the 4 candidate beams is selected as the target beam; when the 2 bit code words are 01, it means that beam #2 of the 4 candidate beams is selected as the target beam; when the 2 bit code words are 10, it means that beam #3 of the 4 candidate beams is selected as the target beam; when the 2 bit code words are 11, it means beam #4 of the 4 candidate beams is selected as the target beam.

Optionally, the identification information of the above-mentioned target beam may also be the serial number of the target beam in the candidate beams. The serial number may be a TCI (transmission configuration indication) state numbering sequence corresponding to the candidate beam. For example, beam #1 corresponds to TCI #2, beam #2 corresponds to TCI #7, beam #3 corresponds to TCI #14, and beam #4 corresponds to TCI #18.

In conclusion, in the technical solutions provided in the embodiments of the disclosure, the target beam selected by the terminal for the beam failure recovery is notified to the base station by transmitting the target beam indication information to the base station, thereby providing the recovery solution for the terminal when the beam failure occurs in the secondary serving cell to realize the beam failure recovery of the secondary serving cell.

Figure 3:
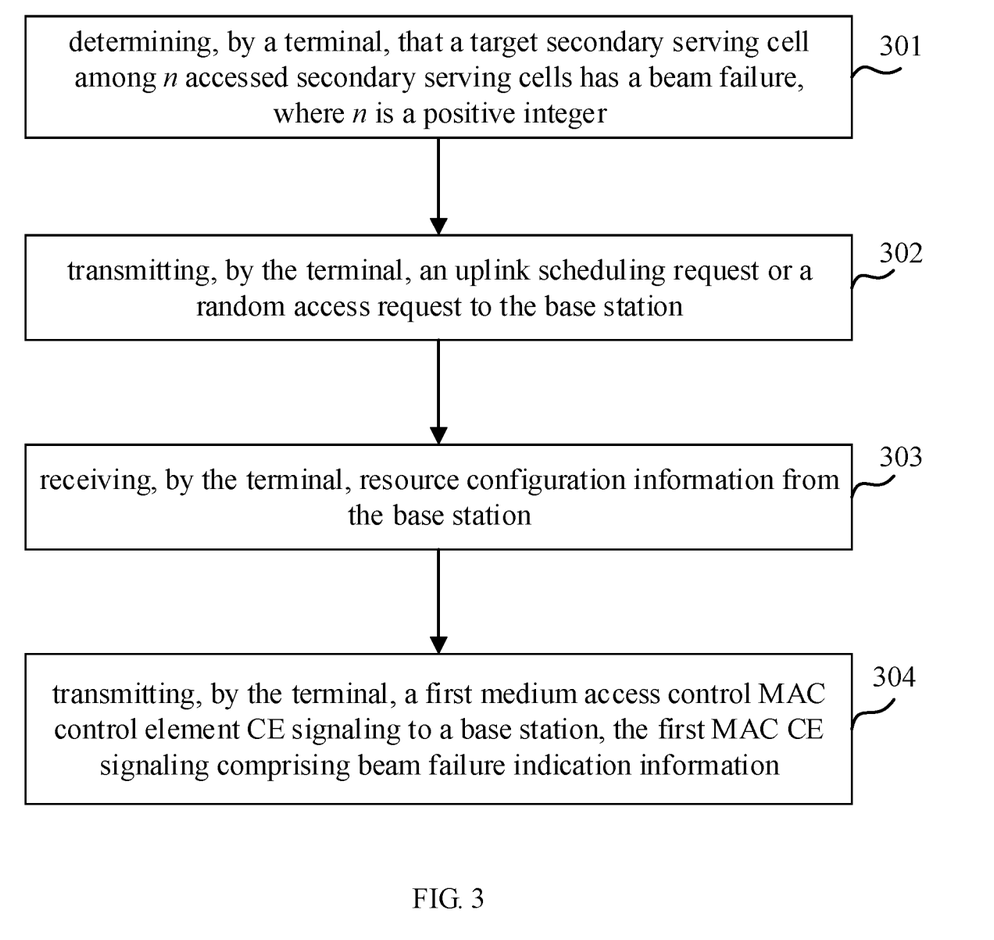
FIG. 3 is a flow chart illustrating a method for reporting a beam failure, according to another exemplary embodiment.

FIG. 3 is a flow chart illustrating a method for reporting a beam failure, according to another exemplary embodiment. The method may be applicable to the terminal illustrated in FIG. 1. The method may include the following.

In 301, the terminal determines that a target secondary serving cell among n accessed secondary serving cells has a beam failure, where n is a positive integer.

The introduction of this action is the same as or similar to the introduction of the action in 201 in the embodiments of FIG. 2, and will not be repeated herein.

Optionally, after determining that the beam failure has occurred in the target accessed secondary serving cell, the terminal may indicate to the base station that the beam failure has occurred, including the following.

In 302, the terminal transmits an uplink scheduling request or a random access request to the base station.

The above-mentioned SR (Scheduling Request) or random access (Random Access) request is configured to notify the base station of the beam failure of the terminal.

Optionally, the above SR may be a general SR, that is, the SR is the same as the SR used by the terminal to request the base station to configure the resource for transmitting the uplink data. The above SR may also be an SR dedicated to reporting the beam failure, that is, the SR is different from the SR used by the terminal to request the base station to configure the resource for transmitting the uplink data.

The resource of the aforementioned random access request may be a time-frequency code resource specifically used to indicate the beam failure when the random access is performed, that is, the base station configures a dedicated random access time-frequency code resource for the terminal, and when the base station receives a specific random access preamble on the time-frequency code resource, the base station knows that the terminal has the beam failure. However, if the base station needs to further know which serving cell or serving cells where the terminal has the beam failure, it needs to further configure a PUSCH resource to the terminal to transmit the identification information of the target secondary serving cell where the beam failure occurs.

Optionally, the aforementioned SR is transmitted on a PUCCH (Physical Uplink Control Channel) resource.

Optionally, the PUSCH resource is a resource on the target secondary serving cell; or the PUSCH resource is a resource on a primary serving cell accessed by the terminal; or the PUSCH resource is a resource on a primary secondary serving cell (PSCell) among the n secondary serving cells; or the PUSCH resource is a resource on other secondary serving cells in the n secondary serving cells except the target secondary serving cell.

Exemplarily, when the target secondary serving cell belongs to an MCG (Master Cell group), the PUCCH resource may be the resource on the primary serving cell accessed by the terminal; when the target secondary serving cell belongs to a SCG (Secondary Cell group), the PUCCH resource may be the resource on the PSCell in the n secondary serving cells.

Optionally, the random access request is transmitted on a PRACH (Physical Random Access Channel) resource.

Optionally, the PRACH resource is a resource on the target secondary serving cell; or the PRACH resource is a resource on a primary serving cell accessed by the terminal; or the PRACH resource is a resource on a primary secondary serving cell (PSCell) among the n secondary serving cells; or the PRACH resource is a resource on other secondary serving cells in the n secondary serving cells except the target secondary serving cell.

Exemplarily, when the target secondary serving cell belongs to an MCG, the PRACH resource may be the resource on the primary serving cell accessed by the terminal; when the target secondary serving cell belongs to a SCG, the PRACH resource may be the resource on the PSCell in the n secondary serving cells.

In 303, the terminal receives resource configuration information from the base station.

After the base station receives the aforementioned SR or random access request from the terminal, it may learn that the beam failure has occurred. Further, the base station may transmit the resource configuration information to the terminal. The resource configuration information is configured to indicate a physical uplink shared channel PUSCH resource for the terminal to transmit the first MAC CE signaling. Correspondingly, the terminal receives the above resource configuration information from the base station to obtain PUSCH resource.

In 304, the terminal transmits a first medium access control MAC control element CE signaling to a base station. The first MAC CE signaling includes beam failure indication information.

The foregoing beam failure indication information is configured to indicate that the beam failure occurs in the target secondary serving cell. For example, the terminal transmits the first MAC CE signaling on the PUSCH resource obtained through the SR or random access request.

Optionally, if the terminal also transmits the second MAC CE signaling introduced above to the base station, the terminal may also transmit the second MAC CE signaling on the PUSCH resource.

In the embodiments, after determining that the target secondary serving cell has the beam failure, the terminal notifies the base station of the beam failure of the terminal, so that the base station allocates the PUSCH resource for reporting specific information about the beam failure, to the terminal, after receiving the above notification. The terminal employs the PUSCH resource allocated by the base station to transmit the MAC CE signaling to the base station.

In some other examples, when the base station configures a periodic PUSCH resource, the first MAC CE signaling and/or the second MAC CE signaling may be directly transmitted on the periodic PUSCH resource. That is, in this case, the terminal may not need to request the base station to allocate the PUSCH resource for transmitting the MAC CE signaling through the SR or random access request.

Optionally, the PUSCH resource is a resource on the target secondary serving cell; or the PUSCH resource is a resource on a primary serving cell accessed by the terminal; or the PUSCH resource is a resource on a primary secondary serving cell (PSCell) among the n secondary serving cells; or the PUSCH resource is a resource on other secondary serving cells in the n secondary serving cells except the target secondary serving cell.

In conclusion, in the technical solutions provided in the embodiments of the disclosure, the MAC CE signaling(s) for beam failure reporting and recovery may also be transmitted on the PUSCH resource to avoid occupying excessive PUCCH resources.

The follows are apparatus embodiments of the disclosure, which may be configured to implement the method embodiments of the disclosure. For details that are not disclosed in the apparatus embodiments of the disclosure, reference should be made to the method embodiments of the disclosure.

Figure 4:
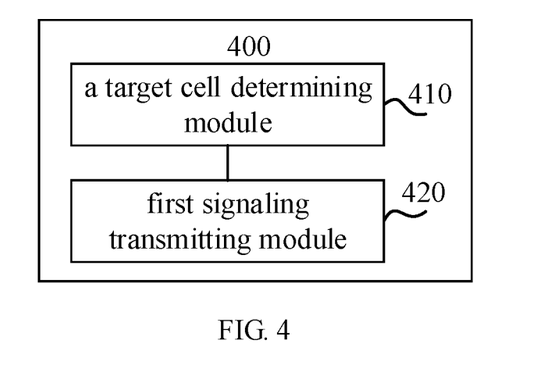
FIG. 4 is a block diagram of an apparatus for reporting a beam failure, according to an exemplary embodiment.

FIG. 4 is a block diagram of an apparatus for reporting a beam failure, according to an exemplary embodiment. The apparatus has the function of realizing the above method embodiments, and the function may be realized by hardware, or by hardware executing corresponding software. The apparatus may be the terminal introduced above, and may be also set in the terminal. The apparatus 400 may include a target cell determining module 410 and a first signaling transmitting module 420.

The target cell determining module 410 is configured to determine that a target secondary serving cell among n accessed secondary serving cells has a beam failure, where n is a positive integer.

The first signaling transmitting module 420 is configured to transmit a first medium access control MAC control element CE signaling to a base station, the first MAC CE signaling including beam failure indication information for indicating that the target secondary serving cell has the beam failure.

In conclusion, in the technical solutions provided in the embodiments of the disclosure, when the terminal determines that the target secondary serving cell among the multiple accessed secondary serving cells has the beam failure, it transmits the MAC CE signaling including the beam failure indication information to the base station to notify the base station of the target secondary serving cell with the beam failure. Therefore, it may provide the reporting solution for the terminal when the beam failure occurs in the secondary serving cell, and realize the reporting of the beam failure condition of the secondary serving cell.

In an exemplary embodiment, the beam failure indication information is represented by m bit code words, and n bit code words among the m bit code words and the n secondary serving cells have a one-to-one correspondence, m is an integer greater than or equal to n; in which an $i^{th}$ bit code word in the n bit code words is configured to indicate whether an $i^{th}$ secondary serving cell among the n secondary serving cells has the beam failure, and i is a positive integer less than or equal to n.

In an exemplary embodiment, the beam failure indication information is represented by k bit code words, $k=\lceil \log_2 n \rceil$, and $\lceil \ \rceil$ represents rounding up; in which the k bit code words are identification information of the target secondary serving cell.

In an exemplary embodiment, the p candidate beams are beams configured by the base station through a radio resource control RRC signaling; or the p candidate beams are beams activated by a MAC signaling among multiple beams configured by the base station through a RRC signaling.

Figure 5:
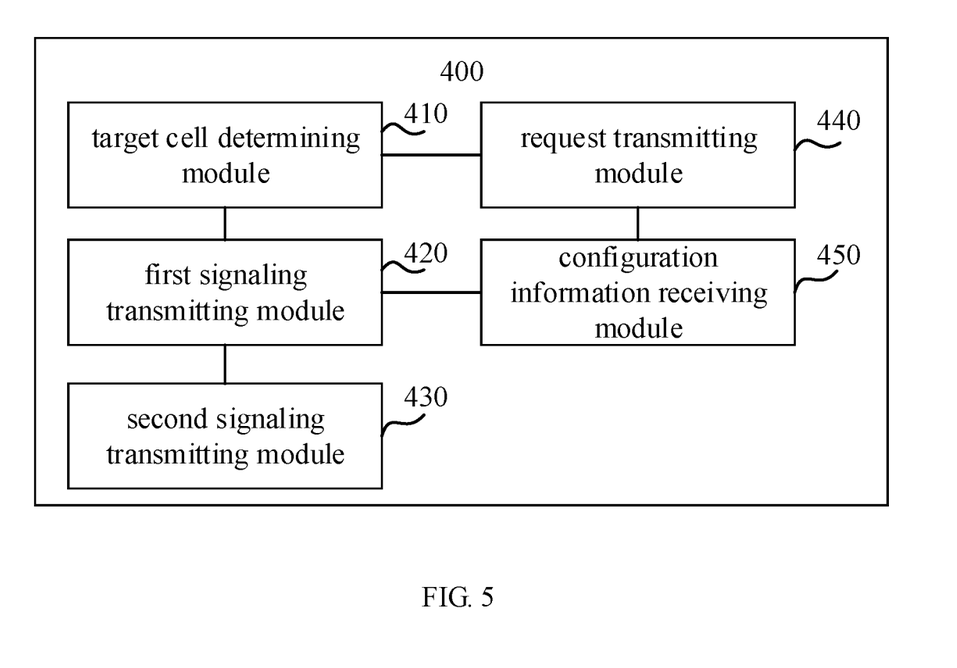
FIG. 5 is a block diagram of an apparatus for reporting a beam failure, according to another exemplary embodiment.

In an exemplary embodiment, as illustrated in FIG. 5, the apparatus 400 further includes a second signaling transmitting module 430.

The second signaling transmitting module 430 is configured to transmit a second MAC CE signaling to the base station, in which the second MAC CE signaling includes target beam indication information, and the target beam indication information is configured to indicate a target beam, selected from p candidate beams, for restoring the beam failure, and p is an integer greater than 1.

In an exemplary embodiment, the target beam indication information is represented by q bit code words, and p bit code words among the q bit code words and the p candidate beams have a one-to-one correspondence, q is an integer greater than or equal to p; in which a $j^{th}$ bit code word among the p bit code words is configured to indicate that a $j^{th}$ candidate beam among the p candidate beams is selected as the target beam, and j is a positive integer less than or equal to p.

In an exemplary embodiment, the target beam indication information is represented by r bit code words, $r=\lceil \log_2 o \rceil$, and $\lceil \ \rceil$ represents rounding up; in which the r bit code words are identification information of the target beam.

In an exemplary embodiment, the p candidate beams are beams configured by the base station through a radio resource control RRC signaling; or the p candidate beams are beams activated by a MAC signaling among multiple beams configured by the base station through a RRC signaling.

In an exemplary embodiment, as illustrated in FIG. 5, the apparatus 400 further includes a request transmitting module 440 and a configuration information receiving module 450.

The request transmitting module 440 is configured to transmit an uplink scheduling request or a random access request to the base station, in which the uplink scheduling request or the random access request is configured to notify the base station of an occurrence of the beam failure of the terminal.

The configuration information receiving module 450 is configured to receive resource configuration information from the base station, in which the resource configuration information is configured to indicate a physical uplink shared channel PUSCH resource for the terminal to transmit the first MAC CE signaling.

In an exemplary embodiment, the first MAC CE signaling is transmitted on a periodic physical uplink shared channel PUSCH resource configured by the base station for the terminal.

In an exemplary embodiment, the PUSCH resource is a resource on the target secondary serving cell; or the PUSCH resource is a resource on a primary serving cell accessed by the terminal; or the PUSCH resource is a resource on a primary secondary serving cell among the n secondary serving cells; or the PUSCH resource is a resource on other secondary serving cells in the n secondary serving cells except the target secondary serving cell.

It should be noted that, when the apparatus provided in the above embodiments realizes its functions, only the division of the above functional modules is used as an example. In actual applications, the above functions may be allocated by different functional modules according to actual needs. That is, the content structure of the apparatus is divided into different function modules to complete all or part of the functions described above.

Regarding to the apparatus in the above embodiments, the specific methods in which each module performs has been described in detail in the embodiments of the method, and will not be elaborated herein.

An exemplary embodiment of the disclosure also provides a device for reporting a beam failure. The device may be applicable to the terminal introduced above. The device may implement the method for reporting the beam failure provided in the disclosure. The device may include: a processor, and a memory for storing executable instructions of the processor.

The processor is configured to determine that a target secondary serving cell among n accessed secondary serving cells has a beam failure, where n is a positive integer.

The processor is further configured to transmit a first medium access control MAC control element CE signaling to a base station, the first MAC CE signaling including beam failure indication information for indicating that the target secondary serving cell has the beam failure.

In an exemplary embodiment, the beam failure indication information is represented by m bit code words, and n bit code words among the m bit code words and the n secondary serving cells have a one-to-one correspondence, m is an integer greater than or equal to n.

An $i^{th}$ bit code word in the n bit code words is configured to indicate whether an $i^{th}$ secondary serving cell among the n secondary serving cells has the beam failure, and i is a positive integer less than or equal to n.

In an exemplary embodiment, the beam failure indication information is represented by k bit code words, $k=\lceil \log_2 n \rceil$, and $\lceil\ \rceil$ represents rounding up. The k bit code words are identification information of the target secondary serving cell.

In an exemplary embodiment, the first MAC CE signaling further includes target beam indication information, and the target beam indication information is configured to indicate a target beam, selected from p candidate beams, for restoring the beam failure, and p is an integer greater than 1.

In an exemplary embodiment, the processor is configured as follows.

The processor is configured to transmit a second MAC CE signaling to the base station, in which the second MAC CE signaling includes target beam indication information, and the target beam indication information is configured to indicate a target beam, selected from p candidate beams, for restoring the beam failure, and p is an integer greater than 1.

In an exemplary embodiment, the target beam indication information is represented by q bit code words, and p bit code words among the q bit code words and the p candidate beams have a one-to-one correspondence, q is an integer greater than or equal to p.

A $j^{th}$ bit code word among the p bit code words is configured to indicate that a $j^{th}$ candidate beam among the p candidate beams is selected as the target beam, and j is a positive integer less than or equal to p.

In an exemplary embodiment, the target beam indication information is represented by r bit code words, $r=\lceil \log_2 p \rceil$, and $\lceil\ \rceil$ represents rounding up.

The r bit code words are identification information of the target beam.

In an exemplary embodiment, the p candidate beams are beams configured by the base station through a radio resource control RRC signaling or the p candidate beams are beams activated by a MAC signaling among multiple beams configured by the base station through a RRC signaling.

In an exemplary embodiment, the processor is configured as follows.

The processor is configured to transmit an uplink scheduling request or a random access request to the base station, in which the uplink scheduling request or the random access request is configured to notify the base station of an occurrence of the beam failure of the terminal.

The processor is configured to receive resource configuration information from the base station, in which the resource configuration information is configured to indicate a physical uplink shared channel PUSCH resource for the terminal to transmit the first MAC CE signaling.

In an exemplary embodiment, the first MAC CE signaling is transmitted on a periodic physical uplink shared channel PUSCH resource configured by the base station for the terminal.

In an exemplary embodiment, the PUSCH resource is a resource on the target secondary serving cell; or the PUSCH resource is a resource on a primary serving cell accessed by the terminal; or the PUSCH resource is a resource on a primary secondary serving cell among the n secondary serving cells; or the PUSCH resource is a resource on other secondary serving cells in the n secondary serving cells except the target secondary serving cell.

From the perspective of the base station and the terminal, the above introduces the solutions provided in the embodiments of the disclosure. It can be understood that, to realize the above functions, the base station and the terminal may include hardware structures and/or software modules to execute corresponding specific functions. Combined with units and algorithm blocks of examples of embodiments disclosed in the disclosure, the embodiments may be realized by hardware or the combination of hardware and computer software. Whether a certain function is executed by hardware or driving hardware by computer software may be determined by specific application and design constraints of the technical solution. Those skilled in the art may use different methods for each specific application to implement the described functions, but such implementation may not be considered as going beyond the scope of the technical solutions of the embodiments of the disclosure.

Figure 6:
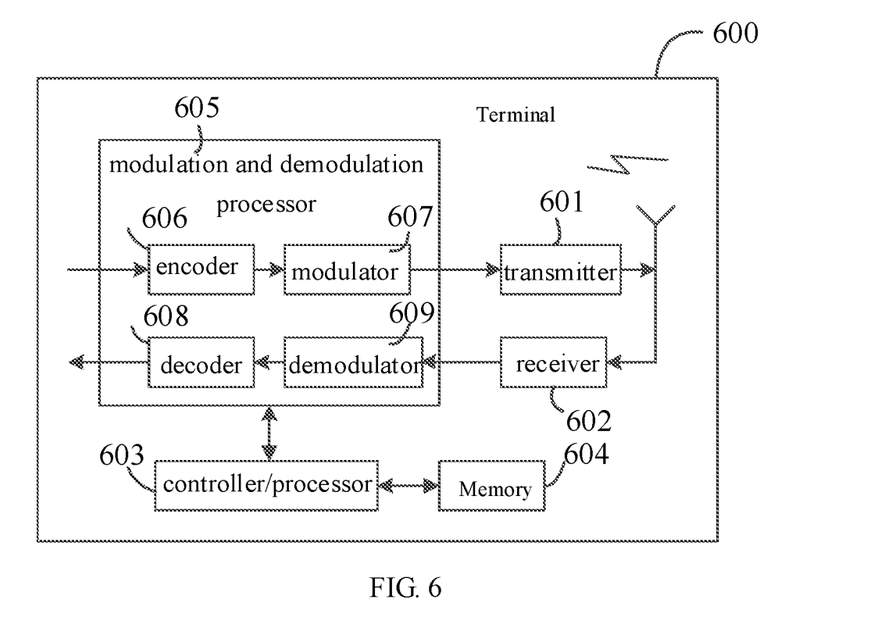
FIG. 6 is a block diagram of a terminal, according to an exemplary embodiment.

FIG. 6 is a block diagram of a terminal, according to an exemplary embodiment.

The terminal 600 includes a transmitter 601, a receiver 602 and a processor 603. The processor 603 may be a controller. FIG. 6 illustrates "controller/processor 603". Optionally, the terminal 600 may further include a modulation and demodulation processor 605. The modulation and demodulation processor 605 may include an encoder 606, a modulator 607, a decoder 608, and a demodulator 609.

In an example, the transmitter 601 adjusts (e.g., analog conversion, filter, amplification, and up conversion) output samples and generates an uplink signal. The uplink signal is transmitted to the base station by an antenna. On the downlink, the antenna receives the downlink signal transmitted by the base station. The receiver 602 adjusts (e.g., filter, amplification, down conversion, and digitization) the signal received from the antenna and provides input samples. In the modulation and demodulation processor 605, the encoder 606 receives service data and signaling messages to be transmitted on the uplink, and processes the service data and signaling messages (e.g., formatting, encoding, and intertwining). The modulator 607 further processes (e.g., symbol mapping and modulation) the encoded service data and signaling messages and provides output samples. The demodulator 609 processes (e.g., demodulation) the input samples and provides symbol estimation. The decoder 608 processes (e.g., de-intertwining and decoding) the symbol estimation and provides decoded data and signaling messages transmitted to the terminal 600. The encoder 606, the modulator 607, the demodulator 609, and the decoder 608 may be implemented by a synthesized modulation and demodulation processor 605. These units are processed according to the wireless access technology adopted by the wireless access network (e.g., the LTE (Long Term Evolution) and access technologies of other evolved systems). It should be noted that when the terminal 600 does not include the processor 605, the above functions of the processor 605 may also be realized by the processor 603.

The processor 603 controls and manages the actions of the terminal 600, and is configured to execute the processing procedure performed by the terminal 600 in the above embodiments of the disclosure. For example, the processor 603 is further configured to execute each action of the terminal side in the above method embodiments, and/or other actions of the technical solutions described in the embodiments of the disclosure.

Further, the terminal 600 may also include a memory 604. The memory 604 is configured to store program codes and data for the terminal 600.

It should be understood that FIG. 6 only illustrates a simplified design of the terminal 600. In practical applications, the terminal 600 may include any number of transmitters, receivers, processors, modem processors, memories, etc., and all terminals that can implement the embodiments of the disclosure are within the protection scope of the embodiments of the disclosure.

Figure 7:
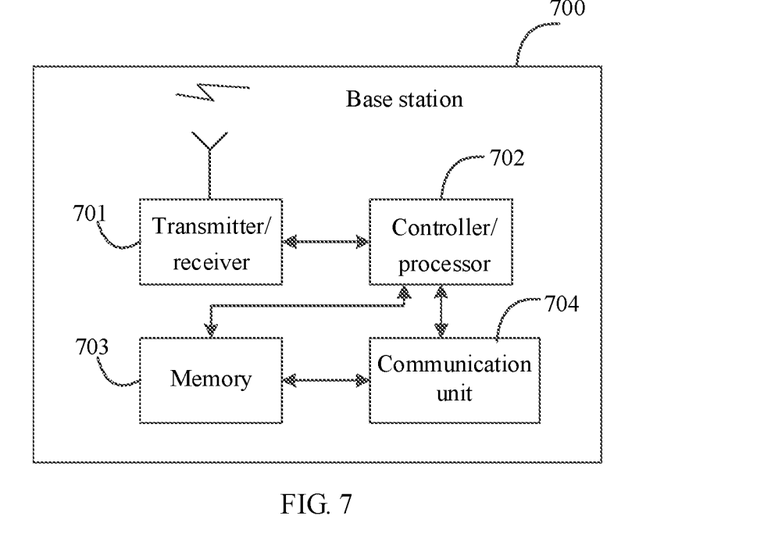
FIG. 7 is a block diagram of a base station, according to an exemplary embodiment.

FIG. 7 is a block diagram of a base station, according to an exemplary embodiment.

The base station 700 includes a transmitter/receiver 701 and a processor 702. The processor 702 may be a controller. FIG. 7 illustrates "controller/processor 702". The transmitter/receiver 701 is configured to support the information transmission and reception between the base station and the terminal in the above embodiments, and to support communication between the base station and other network entities. The processor 702 executes all functions for communicating with the terminal. On the uplink, the uplink signal from the terminal is received by the antenna, demodulated by the receiver 701 (for example, the high-frequency signal is modulated into a base-band signal), and further processed by the processor 702 to restore service data and signaling messages transmitted by the terminal. On the downlink, service data and signaling messages are processed by the processor 702, and modulated by the transmitter 701 (for example, a base-band signal is modulated into a high-frequency signal) to generate a downlink signal, which is transmitted to the terminal by an antenna. It should be noted that the functions of demodulation or modulation may also be achieved by the processor 702. For example, the processor 702 is further configured to execute each action of the base station side in the above method embodiments, and/or other actions of the technical solutions described in the embodiments of the disclosure.

Further, the base station 700 may also include memory 703. The memory 703 is configured to store program codes and data of the base station 700. In addition, the base station 700 may also include a communication unit 704. The communication unit 704 is configured to support the base station 700 to communicate with other network entities (for example, network devices in the core network). For example, in the 5G NR system, the communication unit 704 may be a NG-U interface for supporting the base station 700 to communicate with UPF (User Plane Function) entities; or, the communication unit 704 may also be a NG-C interface, which is configured to support the communication between the base station 700 and AMF (Access and Mobility Management Function) entities.

It should be understood that FIG. 7 only illustrates a simplified design of the base station 700. In practical applications, the base station 700 may include any number of transmitters, receivers, processors, controllers, memories, communication units, etc., and all the base station that realize the embodiments of the disclosure may be within the protection scope of the embodiments of the disclosure.

The embodiments of the disclosure also provide a non-transitory computer-readable storage medium, on which a computer program is stored, and when the computer program is executed by the processor of the base station, the method for reporting the beam failure introduced above is implemented.

It should be understood that "multiple or a plurality of" mentioned herein refers to two or more. "And/or" describes the associated relationship of associated objects, and indicates that there are three types of relationships, for example, A and/or B, which means: A exists alone, A and B exist at the same time, and B exists alone. The character "/" generally indicates that associated objects are in an "or" relationship.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings and that various modifications and changes can be made without departing from the scope thereof. It is intended that the scope of the disclosure only be limited by the appended claims.

What is claimed is:
1. A method for reporting a beam failure, comprising:
    determining, by a terminal, that a target secondary serving cell among n accessed secondary serving cells has a beam failure, where n is a positive integer; and transmitting, by the terminal, a first medium access control (MAC) control element (CE) signaling to a base station, the first MAC CE signaling comprising beam failure indication information for indicating that the target secondary serving cell has the beam failure;
wherein the beam failure indication information is represented by a k-bit code word, k=⌈log$_2$ n⌉, and ⌈ ⌉ represents rounding up;
in which the k-bit code word is identification information of the target secondary serving cell.

2. The method as claimed in claim 1, wherein the beam failure indication information is represented by an m-bit code words, and an n-bit code words among the m-bit code words and the n secondary serving cells have a one-to-one correspondence, m is an integer greater than or equal to n;
in which an i$^{th}$ bit in the n-bit code word is configured to indicate whether an i$^{th}$ secondary serving cell among the n secondary serving cells has the beam failure, and i is a positive integer less than or equal to n.

3. The method as claimed in claim 1, wherein the first MAC CE signaling further comprises target beam indication information, and the target beam indication information is configured to indicate a target beam, selected from p candidate beams, for restoring the beam failure, and p is an integer greater than 1.

4. The method as claimed in claim 1, further comprising:
transmitting, by the terminal, a second MAC CE signaling to the base station, wherein the second MAC CE signaling comprises target beam indication information, and the target beam indication information is configured to indicate a target beam, selected from p candidate beams, for restoring the beam failure, and p is an integer greater than 1.

5. The method as claimed in claim 3, wherein the target beam indication information is represented by q-bit code word, and p-bit code words among the q-bit code words and the p candidate beams have a one-to-one correspondence, q is an integer greater than or equal to p;
in which a j$^{th}$ bit among the p-bit code word is configured to indicate that a j$^{th}$ candidate beam among the p candidate beams is selected as the target beam, and j is a positive integer less than or equal to p.

6. The method as claimed in claim 3, wherein the target beam indication information is represented by a r-bit code words, r=⌈log$_2$ p⌉, and ⌈ ⌉ represents rounding up;
in which the r-bit code word is identification information of the target beam.

7. The method as claimed in claim 3, wherein,
the p candidate beams are beams configured by the base station through a radio resource control RRC signaling; or,
the p candidate beams are beams activated by a MAC signaling among multiple beams configured by the base station through a RRC signaling.

8. The method as claimed in claim 1, further comprising:
transmitting, by the terminal, an uplink scheduling request or a random access request to the base station, wherein the uplink scheduling request or the random access request is configured to notify the base station of an occurrence of the beam failure of the terminal; and
receiving, by the terminal, resource configuration information from the base station, wherein the resource configuration information is configured to indicate a physical uplink shared channel PUSCH resource for the terminal to transmit the first MAC CE signaling.

9. The method as claimed in claim 1, wherein the first MAC CE signaling is transmitted on a periodic physical uplink shared channel PUSCH resource configured by the base station for the terminal.

10. The method as claimed in claim 8, wherein:
the PUSCH resource is a resource on the target secondary serving cell; or
the PUSCH resource is a resource on a primary serving cell accessed by the terminal; or
the PUSCH resource is a resource on a primary secondary serving cell among the n secondary serving cells; or
the PUSCH resource is a resource on other secondary serving cells in the n secondary serving cells except the target secondary serving cell.

11. A device for reporting a beam failure, for a terminal, comprising:
a processor; and
a memory for storing instructions executable by the processor;
wherein the processor is configured to:
determine that a target secondary serving cell among n accessed secondary serving cells has a beam failure, where n is a positive integer; and
transmit a first medium access control (MAC) control element (CE) signaling to a base station, the first MAC CE signaling comprising beam failure indication information for indicating that the target secondary serving cell has the beam failure;
wherein the beam failure indication information is represented by a k-bit code word, k=⌈log$_2$ n⌉, and ⌈ ⌉ represents rounding up;
in which the k-bit code word is identification information of the target secondary serving cell.

12. A non-transitory computer-readable storage medium having stored therein computer programs that, when executed by a processor, a method for reporting a beam failure is performed, the method comprising:
determining, by a terminal, that a target secondary serving cell among n accessed secondary serving cells has a beam failure, where n is a positive integer; and
transmitting, by the terminal, a first medium access control MAC control element CE signaling to a base station, the first MAC CE signaling comprising beam failure indication information for indicating that the target secondary serving cell has the beam failure;
wherein the beam failure indication information is represented by a k-bit code word, k=⌈log$_2$ n⌉, and ⌈ ⌉ represents rounding up;
in which the k-bit code word is identification information of the target secondary serving cell.

13. The device as claimed in claim 11, wherein the beam failure indication information is represented by an m-bit code words, and an n-bit code words among the m-bit code words and the n secondary serving cells have a one-to-one correspondence, m is an integer greater than or equal to n;
in which an i$^{th}$ bit in the n-bit code word is configured to indicate whether an i$^{th}$ secondary serving cell among the n secondary serving cells has the beam failure, and i is a positive integer less than or equal to n.

14. The device as claimed in claim 11, wherein the first MAC CE signaling further comprises target beam indication information, and the target beam indication information is configured to indicate a target beam, selected from p candidate beams, for restoring the beam failure, and p is an integer greater than 1.

15. The device as claimed in claim 11, wherein the processor is configured to:

transmit a second MAC CE signaling to the base station, wherein the second MAC CE signaling comprises target beam indication information, and the target beam indication information is configured to indicate a target beam, selected from p candidate beams, for restoring the beam failure, and p is an integer greater than 1.

16. The device as claimed in claim 14, wherein the target beam indication information is represented by a q-bit code words, and a p-bit code words among the q-bit code words and the p candidate beams have a one-to-one correspondence, q is an integer greater than or equal to p;
   in which a $j^{th}$ bit among the p-bit code word is configured to indicate that a $j^{th}$ candidate beam among the p candidate beams is selected as the target beam, and j is a positive integer less than or equal to p.

17. The device as claimed in claim 14, wherein the target beam indication information is represented by a r-bit code words, $r=\lceil \log_2 p \rceil$, and $\lceil \ \rceil$ represents rounding up;
   in which the r-bit code word is identification information of the target beam.

18. The device as claimed in claim 11, wherein the processor is configured to:
   transmit an uplink scheduling request or a random access request to the base station, wherein the uplink scheduling request or the random access request is configured to notify the base station of an occurrence of the beam failure of the terminal; and
   receive resource configuration information from the base station, wherein the resource configuration information is configured to indicate a physical uplink shared channel PUSCH resource for the terminal to transmit the first MAC CE signaling.

\* \* \* \* \*